United States Patent
Zhou

(10) Patent No.: US 8,913,140 B2
(45) Date of Patent: Dec. 16, 2014

(54) ROLLING SHUTTER REDUCTION BASED ON MOTION SENSORS

(75) Inventor: Jianping Zhou, Fremont, CA (US)

(73) Assignee: Apple Inc., Cupertino, CA (US)

( * ) Notice: Subject to any disclaimer, the term of this patent is extended or adjusted under 35 U.S.C. 154(b) by 157 days.

(21) Appl. No.: 13/598,268

(22) Filed: Aug. 29, 2012

(65) Prior Publication Data

US 2013/0044230 A1    Feb. 21, 2013

Related U.S. Application Data

(63) Continuation-in-part of application No. 13/209,899, filed on Aug. 15, 2011, now Pat. No. 8,786,716.

(60) Provisional application No. 61/657,706, filed on Jun. 8, 2012.

(51) Int. Cl.
*H04N 5/228* (2006.01)
*H04N 5/232* (2006.01)
*H04N 5/353* (2011.01)

(52) U.S. Cl.
CPC ........ *H04N 5/23267* (2013.01); *H04N 5/23258* (2013.01); *H04N 5/2329* (2013.01); *H04N 5/3532* (2013.01)
USPC ..................................... 348/208.4; 348/208.1

(58) Field of Classification Search
USPC ............... 348/208.99, 208.1–208.4
See application file for complete search history.

(56) References Cited

U.S. PATENT DOCUMENTS

| | | | |
|---|---|---|---|
| 7,382,400 B2 | 6/2008 | Sablak | |
| 7,564,482 B2 | 7/2009 | Clarke et al. | |
| 7,574,122 B2 | 8/2009 | Fukumoto et al. | |
| 7,576,778 B2 | 8/2009 | Hirota et al. | |
| 7,705,885 B2 | 4/2010 | Prieto et al. | |
| 7,796,872 B2 | 9/2010 | Sachs et al. | |
| 8,068,140 B2 | 11/2011 | Helbing | |

(Continued)

FOREIGN PATENT DOCUMENTS

GB    2483224 A    3/2012

OTHER PUBLICATIONS

Hong et al., "Video Stabilization and Rolling Shutter Distortion Reduction," Proceedings of 2010 IEEE 17th International Conference on Image Processing, pp. 3501-3504, Sep. 26-29, 2010, Hong Kong.

(Continued)

*Primary Examiner* — Kelly L Jerabek
(74) *Attorney, Agent, or Firm* — Kenyon & Kenyon, LLP

(57) ABSTRACT

This disclosure pertains to devices, methods, and computer readable media for reducing rolling shutter distortion effects in captured video frames based on timestamped positional information obtained from positional sensors in communication with an image capture device. In general, rolling shutter reduction techniques are described for generating and applying image segment-specific perspective transforms to already-captured segments of a single image or images in a video sequence, to compensate for unwanted distortions that occurred during the read out of the image sensor. Such distortions may be due to, for example, the use of CMOS sensors combined with the movement of the image capture device. In contrast to the prior art, rolling shutter reduction techniques described herein may be applied to captured images or videos in real-time or near real-time using positional sensor information and without intensive image processing that would require an analysis of the content of the underlying image data.

37 Claims, 13 Drawing Sheets

(56) References Cited

U.S. PATENT DOCUMENTS

| | | | |
|---|---|---|---|
| 8,508,605 B2 * | 8/2013 | Dolgin et al. | 348/208.4 |
| 2009/0160957 A1 * | 6/2009 | Deng et al. | 348/208.99 |
| 2011/0211082 A1 * | 9/2011 | Forssen et al. | 348/208.2 |
| 2012/0092559 A1 * | 4/2012 | Ubillos | 348/607 |

OTHER PUBLICATIONS

Meingast, Marci, et al., "Geometric Models of Rolling-Shutter Cameras", EECS Department, University of California Berkley, Mar. 29, 2005.

Chang, Li-Wen, et al., "Analysis and Compensation of Rolling Shutter Effect for CMOS Image Sensors", IEEE Transactions on Image Processing, vol. 17:8, pp. 1323-1330, Aug. 2008.

Forssen, Per-Erik, et al., "Rectifying rolling shutter video from hand-held devices", 2010 IEEE Conference on Computer Vision and Pattern Recognition (CVPR), San Francisco CA, pp. 507-514, Jun. 13-18, 2010.

Heflin, Brian, et al., "Correcting Rolling-Shutter Distortion of CMOS Sensors using Facial Feature Detection", 2010 Fourth IEEE International Conference on Biometrics: Theory Applications and Systems (BTAS), Washington DC, pp. 1-6, Sep. 27-29, 2010.

Chun, Jung-Bum, et al., "Suppressing Rolling-Shutter Distortion of CMOS Image Sensors by Motion Vector Detection", IEEE Transactions on Consumer Electronics, vol. 54:4, pp. 1479-1487, Nov. 2008.

RollingShutter 1.1 User Guide for After Effects, The Foundry Visionmongers Ltd., 34 pgs., 2011.

Bradley, Derek, et al., "Synchronization and Rolling Shutter Compensation for Consumer Video Camera Arrays", IEEE Computer Society Conference on Computer Vision and Pattern Recognition Workshops, Miami FL, pp. 1-8, Jun. 20-25, 2009.

Nishino, Ko, "Introduction to Computer Vision", Week 2, Fall 2010.

"PhotoSolid®" Image Stabilization Technology by Morpho, Inc., http://www.morphoinc.com/en/products/PhotoSolid.html, 2 pages, 2011.

"MovieSolid®" Motion Stabilization Technology by Morpho, Inc., http://www.morphoinc.com/en/products/MovieSolid.html, 1 page, 2011.

\* cited by examiner

ROLLING SHUTTER REDUCTION BASED ON MOTION SENSORS

PRIORITY CLAIM

The present application claims priority to U.S. Provisional Application No. 61/657,706, filed on Jun. 8, 2012, and is a continuation-in-part of U.S. patent application Ser. No. 13/209,899, filed on Aug. 15, 2011, the entirety of which are incorporated by reference herein.

BACKGROUND

This disclosure relates generally to the field of image processing. More particularly, but not by way of limitation, this disclosure relates to compensating for unwanted image distortions resulting from the so-called "rolling shutter" effect caused by certain complementary-metal-oxide-semiconductor (CMOS) sensors during video image capture operations.

Today, many personal electronic devices come equipped with digital image sensors that are capable of capturing video composed of a sequence of images. Exemplary personal electronic device of this sort include, but are not limited to, mobile telephones, personal digital assistants, portable music and video players and portable computer systems such as laptop, notebook and tablet computers. Many lower cost, high resolution cameras such as those utilized in compact, portable personal electronic devices are equipped with low-cost, low-power, CMOS sensors that can potentially geometrically distort captured images if there is movement of the device or the object being imaged while the CMOS sensor is capturing the scene.

An image sensor converts photons into electrons, thus converting optical images into electrical signals. Typically, image sensors may be either a charge-coupled device (CCD) or a CMOS. A CMOS sensor, unlike the CCD sensor, does not expose the entire sensor array at the same time since it cannot store and hold all of the individual pixel charges for the entire sensor array. Instead, CMOS sensors employ a so-called "rolling shutter" technique, wherein each row or scan line of the sensor array is exposed at different times, read out sequentially (e.g., from the top of the sensor to the bottom of the sensor), and then merged together to form a single image.

As long as the camera device and the object being imaged are stationary with each other, the output image typically does not include any geometric distortions caused by the "rolling shutter." However, if there is relative movement horizontally or vertically between the image sensor and the object being imaged, the output image may potentially be distorted or temporally sheared, as shown in FIG. 1. This type of distortion is one example of what will be referred to herein as the "rolling shutter effect." Resulting image frames and video sequences suffering from rolling shutter distortions are often aesthetically unpleasing and unwanted, as they do not accurately represent the scene being captured. Further, rolling shutter artifacts can worsen with high resolution images and high frame rates, e.g., 1080p images captured at 30 frames per second.

Some video capture devices now include "on board" motion sensors, i.e., positional sensors (e.g., accelerometers and/or gyrometers), which may be used to assist in various device functions. For example, some devices may use gyrometer data to aid in image stabilization by appropriately adjusting the device's lens and/or sensor mechanism before an image or frame is captured. Once captured, however, the image is retained as part of the video sequence without substantial modification. This approach is not, however, feasible for many devices incorporating video capture capability. For example, at this time, it is generally considered infeasible to provide movable lens mechanisms and the like in such small form factor devices.

Accordingly, there is a need for techniques to reduce the effects of rolling shutter distortion during image and video capture in devices utilizing CMOS or other non-CCD image sensors. By employing appropriate perspective transformations to captured image data based on timestamped information gathered from positional sensors in communication with the image capture device, more efficient image processing techniques may be employed to reduce the effects of rolling shutter distortion. By using novel motion compensation techniques, informed by hardware motion sensors, such as positional sensors, in communication with an image capture device, a robust rolling shutter reduction system may be employed, even in situations where reliably reducing rolling shutter distortion effects was previously thought to be impossible from either computational and/or power consumption standpoints.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

Figure 1:
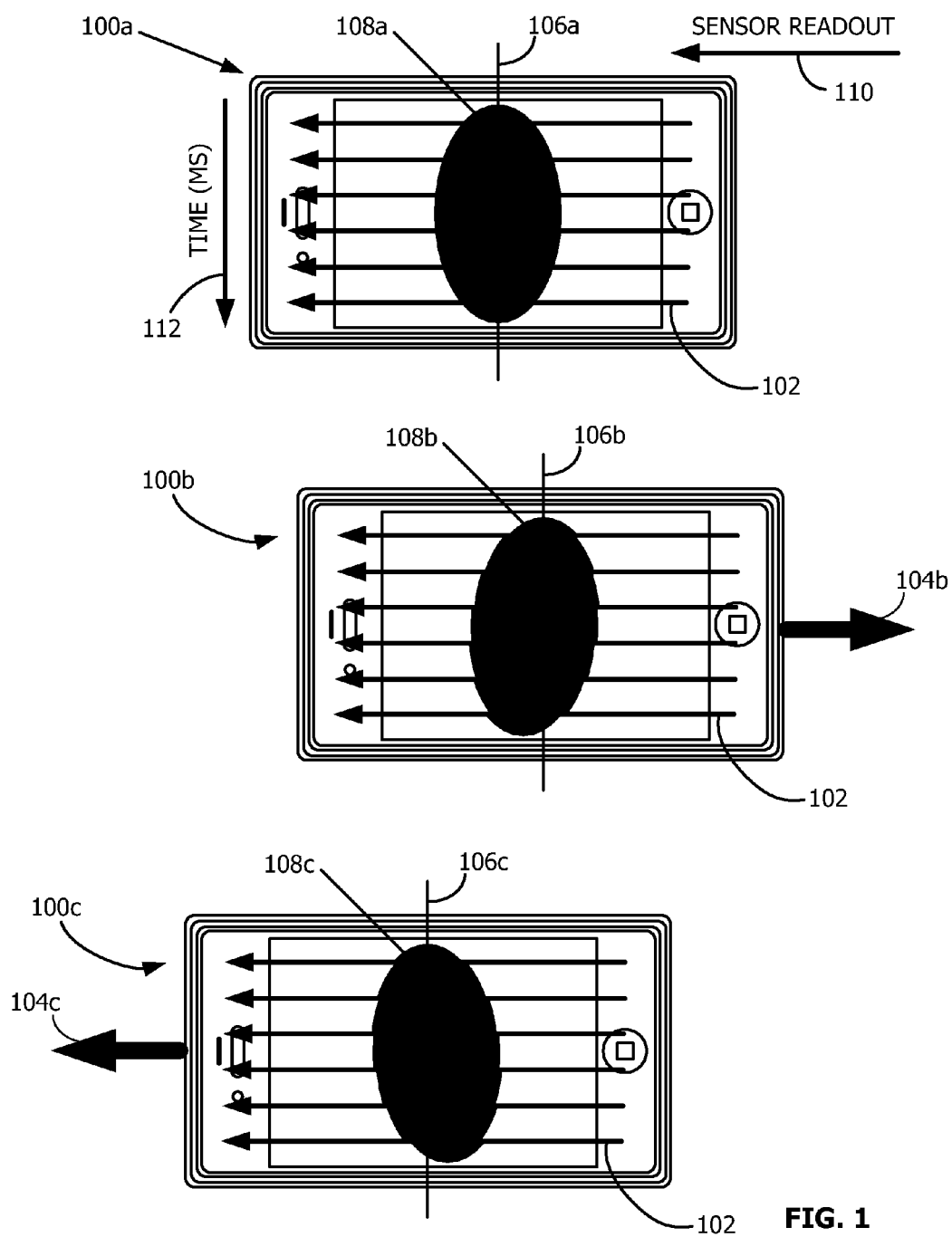
FIG. 1 shows exemplary rolling shutter distortions on the display of an electronic image capture device.

The rolling shutter distortion reduction techniques disclosed herein are designed to handle the processing of images captured by handheld personal electronic devices having CMOS sensors. More specifically, the techniques described herein provide rolling shutter distortion reduction solutions by leveraging timestamped positional sensor data received from positional sensors in communication with an image capture device, wherein the positional sensor information may be correlated with corresponding captured image information that was read out from particular rows of a CMOS sensor at substantially the same time that the corresponding positional sensor information was recorded.

Rolling shutter reduction may be understood with reference to any of the techniques disclosed in the inventors' co-pending application, "Rolling Shutter Reduction Based on Motion Sensors," Ser. No. 13/209,899, filed Aug. 15, 2011, the disclosure of which are incorporated herein in their entirety.

Generalized steps involved in rolling shutter reduction techniques according to embodiments described herein include: acquiring multiple motion samples from positional sensors in communication with an image capture device per captured image frame; defining a plurality of "anchor rows" for each captured image frame, the anchor rows to be used as representatives of device motion during the read out of particular portions of the senor array; calculating a base motion for each of the plurality of anchor rows based on the acquired motion samples corresponding to the read out of the anchor row whose base motion is being calculated; calculating a correction motion for each of the plurality of anchor rows using multiple frame filtering; calculating a 2D-perspective transform matrix for each of a plurality of segments for each captured image frame, the matrices based at least in part on an interpolation of the calculated correction motion of the one or more anchor rows closest to the segment whose transform matrix is being calculated; applying the calculated perspective transform matrix to each segment of each frame independently to generate corrected image segments; assembling the plurality of corrected image segments for each image into a corrected image; and storing the corrected image in a memory.

According to an embodiment, generalized steps involved in rolling shutter reduction techniques according to embodiments described herein include: acquiring multiple motion samples from positional sensors in communication with an image capture device per captured image frame; defining a base row having a calculated motion to which the detected motion in the rest of the frame may be corrected; defining a plurality of anchor rows for the frame; calculating a base motion for each of the plurality of anchor rows based on the acquired motion samples corresponding to the readout of the anchor row whose base motion is being calculated; calculating a correction motion for each of the plurality of anchor rows using the motion of the base row; calculating a 2D-perspective transform matrix for each of a plurality of segments for the frame, the matrices based at least in part on an interpolation of the calculated correction motion of the one or more anchor rows closest to the segment whose transform matrix is being calculated; applying the calculated perspective transform matrix to each segment of each frame independently to generate corrected image segments; assembling the plurality of corrected image segments for each image into a corrected image; and storing the corrected image in a memory.

Thus, in one embodiment described herein, a rolling shutter reduction method is disclosed comprising: obtaining, by a device comprising an image sensor, a sequence of images, wherein each image in the sequence comprises a plurality of sequentially read out rows, and wherein the device has one or more image capture parameters; selecting a first plurality of rows from a first image in the sequence; for each of the first plurality of rows: obtaining motion information corresponding to motion of the device at approximately the time the row was obtained; and determining a motion estimate for the row based, at least in part, on the obtained motion information; defining a first plurality of segments, the first plurality of segments comprising the first image; for each of the first plurality of segments: generating a perspective transformation for the segment based, at least in part, on the motion estimates for one or more of the first plurality of rows; and applying the generated perspective transformation to the segment to generate a corrected image segment; assembling the plurality of corrected image segments into a first corrected image; and storing the first corrected image in a memory.

In another embodiment described herein, a rolling shutter reduction method is disclosed comprising: obtaining a sequence of images from an image sensor in a device, wherein each image in the sequence comprises a plurality of rows, and wherein the device has image capture parameters; selecting a first plurality of rows from a first image in the sequence; determining a motion for each of the first plurality of rows based on motion data from one or more motion sensors of the device; determining a correction motion for each of the first plurality of rows based, at least in part, on the determined motion for the row; identifying a first plurality of segments for the first image, wherein each segment comprises a second plurality of rows; determining a correction motion for each of the first plurality of segments based, at least in part, on the determined correction motion for one or more of the first plurality of rows; generating a transformation for each of the first plurality of segments based, at least in part, on the segment's determined correction motion; independently applying each of the generated transformations to its corresponding segment to generate a corrected image; and storing the corrected image in a memory.

In yet another embodiment described herein, an electronic device, is disclosed comprising: an image sensor; a positional sensor; a memory communicatively coupled to the image sensor; a programmable control device communicatively coupled to the memory and the positional sensor, wherein the memory has computer program code stored thereon for causing the programmable control device to: receive a plurality of sequential images captured by the image sensor, the electronic device having image capture parameters, wherein each of the plurality of sequential images is associated with values corresponding to the image capture parameters at the time each of the images was captured; obtain motion information from the positional sensor for each of the plurality of sequential images, wherein the motion information for each image in the plurality of sequential images is obtained at approximately the same time as each image was captured, and wherein the motion information comprises a plurality of motion samples; divide each image from the plurality of sequential images into a plurality of segments; generate a perspective transformation for each segment of each image based, at least in part, on one or more motion samples corresponding to the segment and the one or more image capture parameters associated with the image; apply the generated perspective transformations independently to each segment of each of the plurality of sequential images to substantially remove rolling shutter distortions; and store each of the perspective transformed plurality of sequential images in the memory.

Novel and improved image processing techniques for rolling shutter distortion reduction, e.g., as may be used for handheld personal electronic image capture devices having positional information sensors, in accordance with the various embodiments described herein may be implemented directly by a device's hardware and/or software, thus making these robust rolling shutter reduction techniques readily applicable to any number of electronic devices with appropriate positional sensors and image processing capabilities, such as mobile phones, personal data assistants (PDAs), portable music players, digital cameras, as well as laptop and tablet computer systems.

This disclosure pertains to devices, methods, and computer readable media for reducing rolling shutter distortion effects in captured video frames based on timestamped positional information obtained from positional sensors (e.g., gyroscopic and accelerometer sensors) in communication with an image capture device. In general, rolling shutter reduction techniques are described for generating and applying image segment-specific transforms to already-captured segments (i.e., portions) of images in a video sequence so as to counter or compensate for unwanted distortions that occurred during the read out of the image sensor. Such distortions may be due to, for example, the use of CMOS sensors combined with the rapid movement of the image capture device with respect to the scene being captured. In contrast to the prior art, rolling shutter reduction techniques described herein may be applied to captured images in real-time or near real-time using positional sensor information, rather than in post-production via processing-intensive image processing routines that would require an analysis of the content of the underlying image data.

The techniques disclosed herein are applicable to any number of electronic devices with optical sensors and/or positional sensors, such as digital cameras, digital video cameras, mobile phones, personal data assistants (PDAs), portable music players, as well as laptop and tablet computer systems.

In the interest of clarity, not all features of an actual implementation are described in this specification. It will of course be appreciated that in the development of any such actual implementation (as in any development project), numerous decisions must be made to achieve the developers' specific goals (e.g., compliance with system- and business-related constraints), and that these goals will vary from one implementation to another. It will be further appreciated that such development effort might be complex and time-consuming, but would nevertheless be a routine undertaking for those of ordinary skill having the benefit of this disclosure.

In the following description, for purposes of explanation, numerous specific details are set forth in order to provide a thorough understanding of the inventive concept. As part of the description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Referring to FIG. 1, an electronic image capture device 100a is shown possessing a display and an exemplary CMOS sensor. As is shown in FIG. 1, a black oval 108a is currently being displayed on the device. As indicated by arrow 110, the CMOS sensor is "read out" sequentially in descending rows 102 of pixels of the image sensor. As indicated by arrow 112, the sensor in the example is reading out from top to bottom chronologically, as measured in this example in milliseconds. More specifically, it is this sequential read out process that is often referred to in the art as a "rolling shutter." The use of a rolling shutter means that there will be different exposure times and different read out times for each row on the image sensor. Typical image sensor packages are capable of providing timestamps for the beginning of each frame. By combining the knowledge of the timestamp for the beginning of a captured frame with the knowledge of the read out speed of the image sensor, the exact capture time for each particular row can be determined. As will be discussed later, knowledge of the capture time for each particular row may be important when attempting to correlate timestamped positional sensor information with particular rows of captured image data.

Turning now to electronic image capture device 100b, the effects of moving the device 100b to the right while the black oval 108b that is being imaged remains stationary are illustrated. Movement of device 100b is represented by arrow 104b. Specifically, and as is further illustrated via the examination of vertical axis 106b, sections of black oval 108b that were captured later in time chronologically by the CMOS sensor (i.e., those near the bottom of the display on device 100b) will not align vertically with the sections of black oval 108b that were captured earlier in time chronologically by the CMOS sensor (i.e., those near the top of the display on device 100b). This may result in the warped effect seen on the display of device 100b, wherein the oval 108b appears to be tilted to the right.

Likewise, turning to electronic image capture device 100c, the effects of moving the device 100c to the left while the black oval 108c that is being imaged remains stationary are illustrated. Movement of device 100c is represented by arrow 104c. Specifically, and as is further illustrated via the examination of vertical axis 106c, sections of black oval 108c that were captured later in time chronologically by the CMOS sensor (i.e., those near the bottom of the display on device 100c) will not align vertically with the sections of black oval 108c that were captured earlier in time chronologically by the CMOS sensor (i.e., those near the top of the display on device 100b). This may result in the warped effect seen on the display of device 100c, wherein the oval 108c appears to be tilted to the left. Any time that an image capture device using a CMOS sensor is moved quickly over a scene (sometimes referred to as a "whip pan"), that is, the sensor is moved before there has been enough time to read out the image data from the entire image sensor, there is a potential for rolling shutter distortions to be manifested in the captured images.

Figure 2:
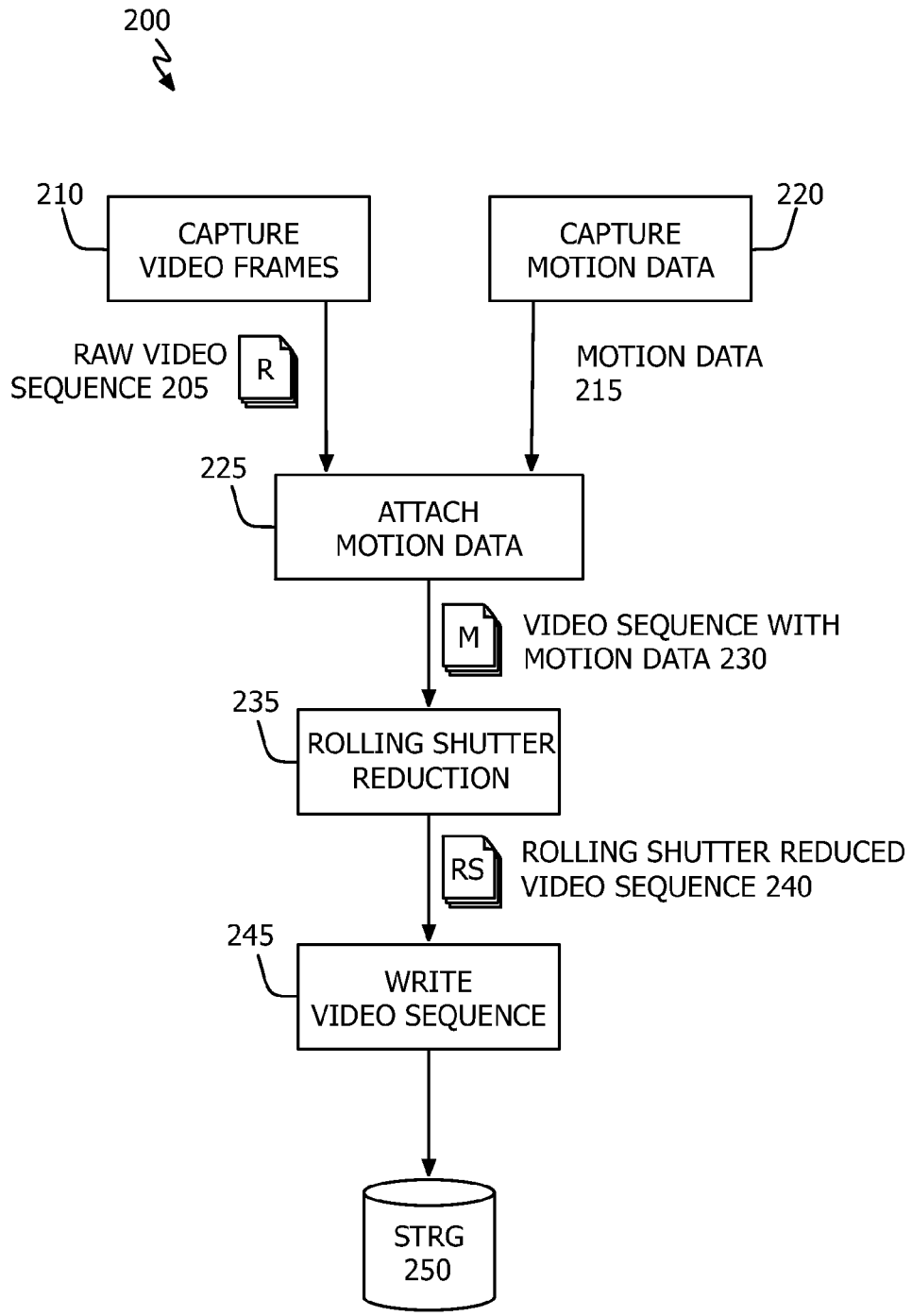
FIG. 2 shows, in flowchart form, a rolling shutter distortion reduction system, in accordance with one embodiment.

Referring to FIG. 2, rolling shutter reduction operation 200 in accordance with one embodiment begins by capturing a raw video sequence 205 (block 210) and corresponding motion data 215 (block 220). Motion information 215 may then be attached to individual frames within raw video sequence 205 (block 225) to produce video sequence 230 with motion data. It can be advantageous to capture motion data for each frame in raw video sequence 205 so that each captured frame has a corresponding motion datum. It can also be advantageous, and is common, for each frame in a video sequence such as raw video sequence 205, to have a timestamp indicating when the particular frame was captured and the read out speed of the image sensor (e.g., during acts in accordance with block 210). Frames within video sequence 230 may then be transformed, in accordance with this disclosure, based on various motion estimates made for multiple segments in each of the frames comprising video sequence 230 to reduce the effects of rolling shutter distortions (block 235). The result is a rolling shutter distortion reduced video sequence 240 that may be written (block 245) to storage 250.

Figure 3A:
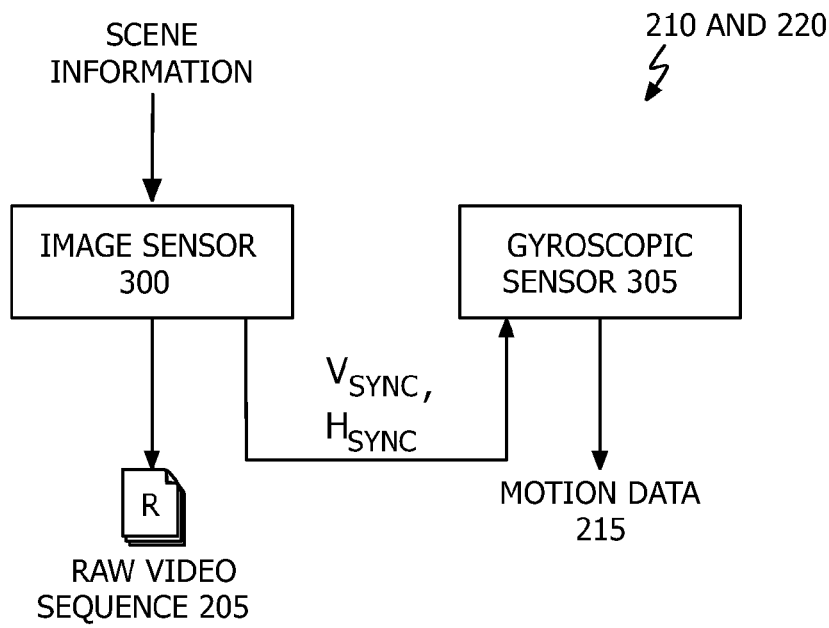
FIGS. 3A and 3B show, in block diagram form, two different embodiments for correlating image data with motion data.

Referring to FIG. 3A, in one embodiment video capture operation 210 may be performed by image sensor 300, and motion data capture operation 220 may be performed by gyroscopic sensor (gyrometer) 305. Image sensor 300 may provide black and white or color images and use, for example, complementary metal-oxide semiconductor (CMOS) technology. Gyro sensor 305 may be used to generate rate data in three dimensions, e.g., (x, y, z) or (pitch, roll, yaw), or in a quaternion system. Gyro sensor 305 may use any desired technology such as micro-electromechanical systems (MEMS) technology.

Figure 3B:
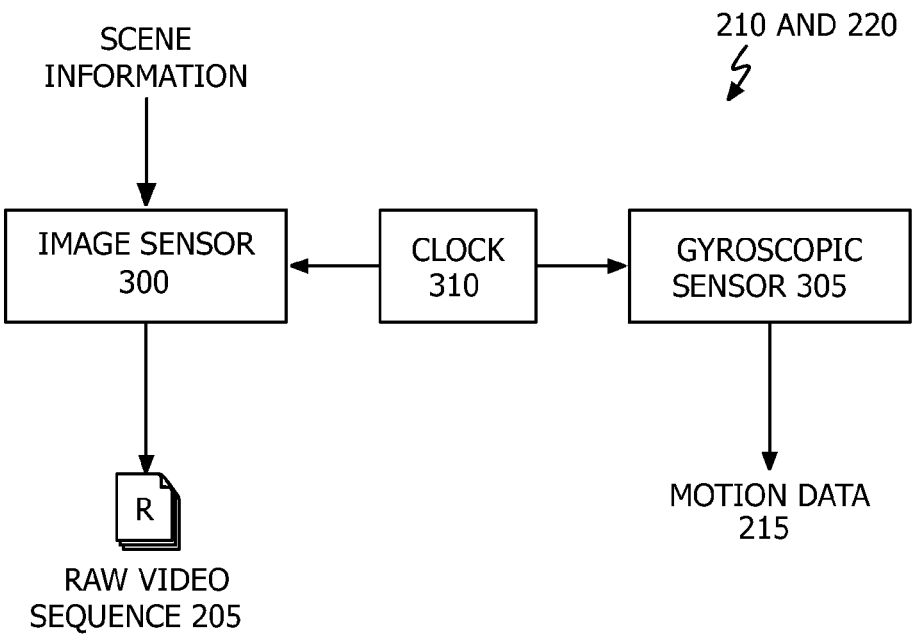

It will be understood that video captured in accordance with block 210 (e.g., by image sensor 300) and motion data captured in accordance with block 220 (e.g., by gyro sensor 305) should be correlated. It is important that an image captured at time t0 be synchronized with motion data captured at approximately the same time. In the embodiment illustrated in FIG. 3A, image sensor 300 may signal gyro sensor 305 each time an image row is captured via, for example, the Vsync and Hsync signals. Gyro sensor 305, in turn, may tag each "next captured" motion datum each time a Vsync or Hsync signal is received. This permits each frame in raw video sequence 205 to be correlated or associated with the proper motion data. Use of the phrase "next captured" reflects the possibility that motion sensor 305 may operate on a different clock signal than image sensor 300. That is, image sensor 300 and motion sensor 305 may operate asynchronously. Referring to FIG. 3B, in another embodiment, common clock 310 may drive both image sensor 300 and motion sensor 305. This arrangement permits the synchronous capture of images and motion data. In another embodiment, common clock 310 may be used to generate timestamps for image sensor 300 and motion sensor 305. In such an embodiment, the data acquisition of the image sensor and the motion sensor are asynchronous, but the timestamps are synchronized via common clock 310.

In some embodiments, the CMOS image sensor may be capturing images at a rate of, e.g., 30 frames per second, while the gyroscopic sensor 305 may be recording motion samples at a much higher rate. For example, some gyroscopic sensors may sample at a rate of 200 times per second. Thus, there may actually be a plurality of motion samples, e.g., 6-7 motion samples, for each and every image frame that is captured by the image sensor. As mentioned above in reference to FIG. 1, CMOS sensors may be read out sequentially, e.g., from the top of the sensor to the bottom of the sensor. This read out process, although very rapid, does take some finite amount of time. Thus, and as will be described herein, for certain rolling shutter reduction techniques, it may be important to correlate particular motion samples recorded by the gyroscopic sensor 305 with certain representative rows of the image sensor. These representative rows will be referred to herein as "anchor rows." The number of anchor rows used in a particular embodiment may range from a single anchor row all the way up to the total number of rows in the image sensor (i.e., each row would technically be an anchor row). Power consumption and processing limitations may be important factors in dictating a suitable number of anchor rows to be used for motion estimation within a captured image. In one embodiment, six anchor rows, evenly spaced across the breadth of the image sensor, are utilized for an image sensor capturing 1,080 rows of pixels. As may be understood, choosing a larger number of anchor rows may provide more granular estimations of the motion of the image capture device during the capture of a particular image frame. However, increasing the number of anchor rows for which motion is estimated will come with the trade off of requiring more power consumption and a greater number of calculations to be performed by the image capture device.

Figure 4:
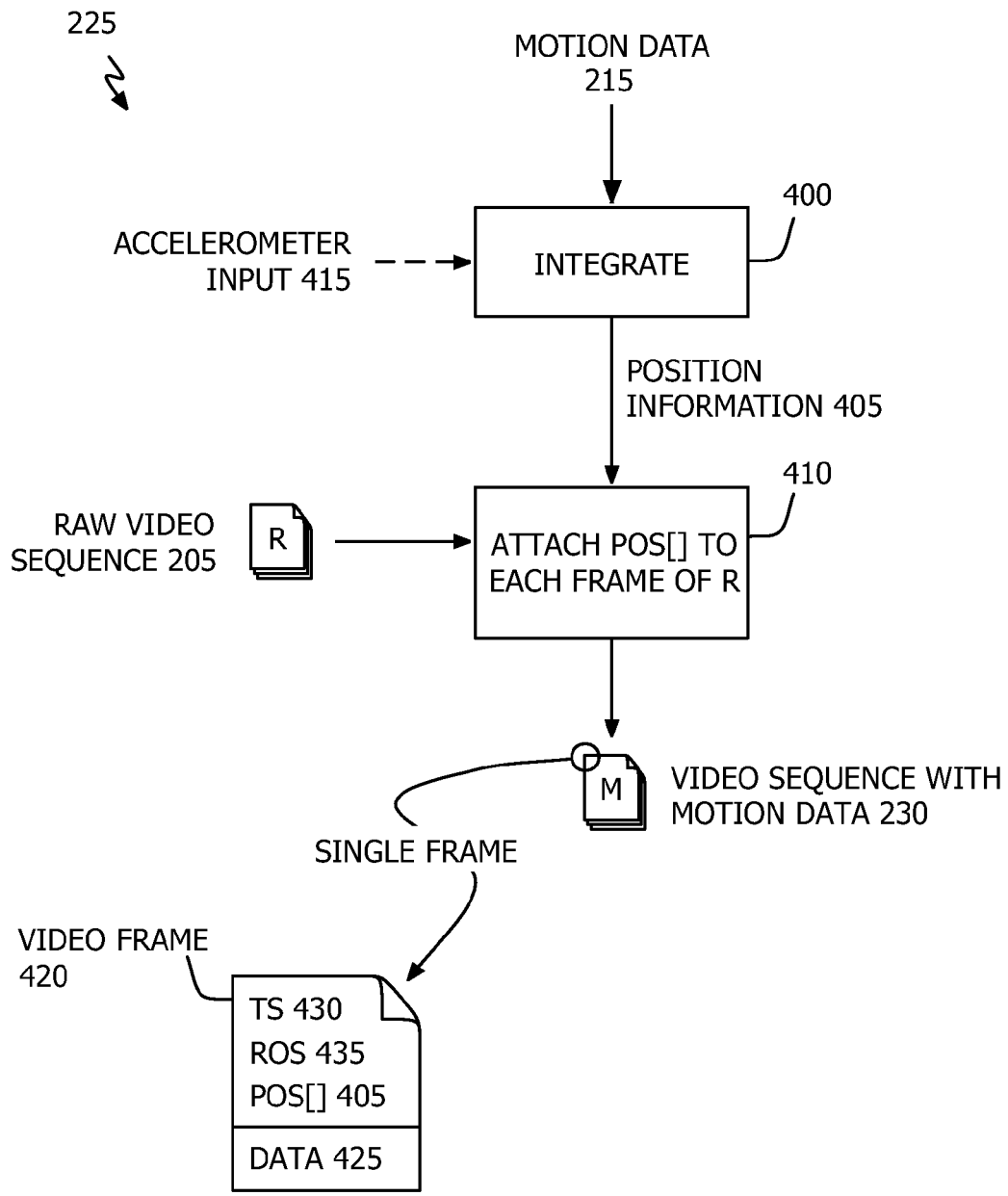
FIG. 4 shows, in flowchart form, motion data being processed and attached to video data, in accordance with one embodiment.

Referring to FIG. 4, in one embodiment motion data 215 may be attached to video data (raw video sequence 205) through a process such as that illustrated in FIG. 4. First, it will be understood that when a gyro such as sensor 305 is used to provide motion data 215, what is actually produced is rate information: the rate at which the video capture device is being moved in, for example, each of 3 axes. Rate data may be integrated (block 400) to produce instantaneous position information 405 (also in each of 3 axes). Using image timestamp information and motion detector tags (which may also employ timestamps), each frame in raw video sequence 205 may be associated with the appropriate position information 405 (block 410). In another embodiment, operation 225 may also use accelerometer input 415 to assist in calibrating gyro sensor 305's output and removing drifting. Also shown in FIG. 4 is a high-level representation of a single image frame 420 from video sequence 230. As shown, video frame 420 includes data 425 representing the image data itself (e.g., comprising a plurality of image segments making up the image frame, wherein each image segment comprises a plurality of rows of pixel data), a timestamp of the first row 430, and the rolling shutter read out speed 435 of the image sensor, which together provide sufficient information to derive the times at which the various rows (e.g., the so-called "anchor rows") of the image frame were read out from the image sensor in accordance with block 210. After the attach operation 410, video frame 420 may also include an array of position information 405 (i.e., motion data), wherein each positional information sample corresponds to the position of the image capture device at a particular point in time during the read out of the various rows of the image sensor in accordance with block 220.

Figure 5:
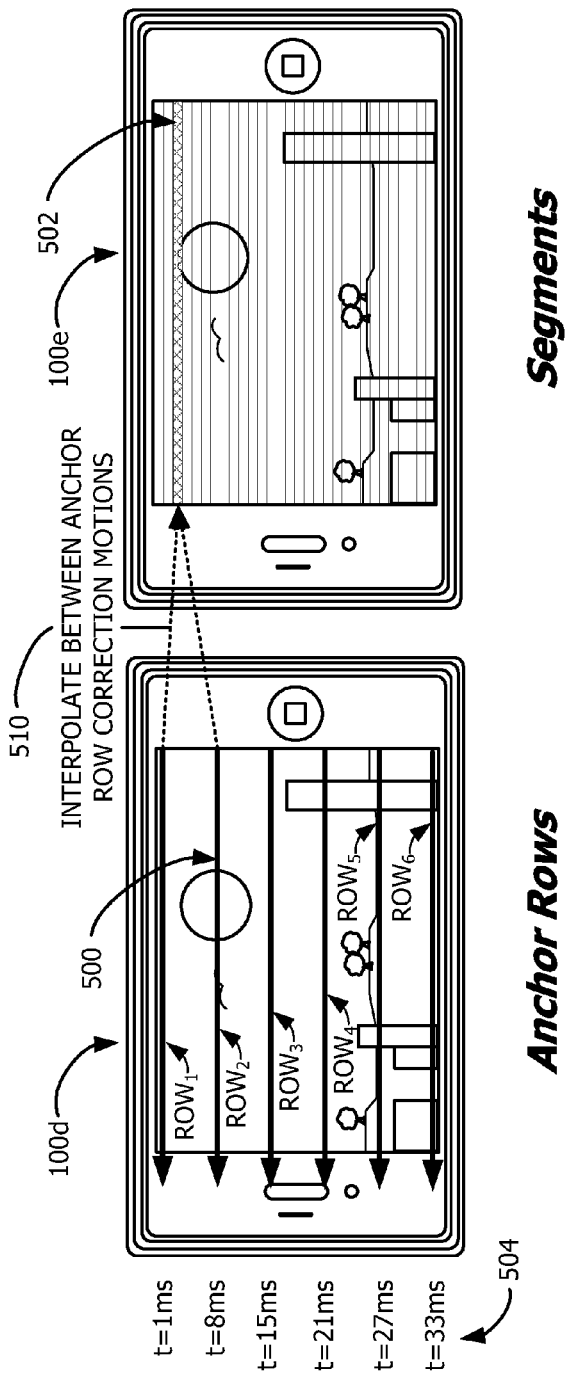
FIG. 5 shows exemplary anchor rows and segments on the display of an electronic image capture device and a timeline for the read out of single image frame, in accordance with one embodiment.
Figure 5:
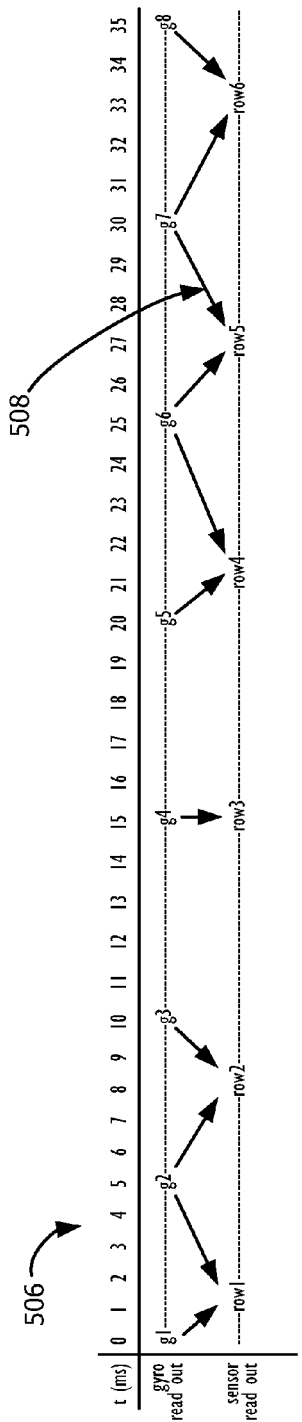

Referring to FIG. 5, exemplary anchor rows 500 and image segments 502 are shown on the displays of electronic image capture devices 100d and 100e, respectively, in accordance with one embodiment. In one particular embodiment, and as is shown in FIG. 5, there are six anchor rows 500 corresponding to six different read out rows from the image sensor of image capture device 100d. As described above, by combining the knowledge of the timestamp for the beginning of a captured frame with the knowledge of the read out speed of the image sensor, the capture time 504 for each particular anchor row can be determined with a fairly high degree of precision. The capture times 504 for each of the anchor rows (ROW1-ROW6) shown on the display of image capture device 100d are listed to the left of image capture device 100d. In the exemplary embodiment of 1080p video frames being captured at the rate of thirty frames per second, it takes approximately 33.3 milliseconds for the sensor to capture a single image frame. As such, the following capture times are shown in FIG. 5 for illustrative purposes: ROW1=1 ms; ROW2=8 ms; ROW3=15 ms; ROW4=21 ms; ROW5=27 ms; ROW6=33 ms. It should be mentioned that, in the exemplary embodiment shown in FIG. 5, each successively captured video frame would have the same number of anchor rows placed at the same locations over the video frame. In other words, anchor row ROW1 in an exemplary video frame, e.g., video frame 15, in a sequence of video frames would have a corresponding ROW1 in the previous video frame, video frame 14, as well as the successive video frame, video frame 16, as well as in all other video frames captured according to the exemplary embodiment. As mentioned above, in one embodiment, a gyroscopic sensor has a sampling rate of 200 Hz, meaning that it reports a positional information sample readout every 5 ms.

Turning next to element 506 of FIG. 5, an exemplary timeline for the read out of single image frame is shown. Across the top of the timeline, time is listed out in one millisecond intervals from 0 ms to 35 ms. The first row of information in the timeline corresponds to gyroscopic sensor read outs. As is shown, the gyroscopic sensor used in the example of FIG. 5 samples at a rate of 200 Hz (i.e., every 5 milliseconds), thus, the timeline shows gyroscopic sensor samples g1-g8 occurring at: 0 ms, 5 ms, 10 ms, 15 ms, 20 ms, 25 ms, 30 ms, and 35 ms. As discussed above, the CMOS sensor used in the example of FIG. 5 has read out the designated anchor rows, ROW1-ROW6 at the following times: 1 ms, 8 ms, 15 ms, 21 ms, 27 ms, and 33 ms. For each anchor row, a device rotation amount may be calculated by interpolating between the nearest gyroscopic sensor samples, i.e., the one or more gyroscopic sensor samples whose determined timestamps are closest to the determined timestamp of the anchor row, as is shown by arrows 508 in FIG. 5. For some anchor rows, such as ROW1, device rotation will be calculated by interpolating between several gyroscopic sensor read out samples, e.g., g1 and g2. For other anchor rows, such as ROW3, there may be a single gyroscopic sensor read out sample, e.g., g4, whose timestamp corresponds very closely with the read out time of the anchor row, such that the device rotation may be calculated by using the single gyroscopic sensor read out sample. As shown in FIG. 5, both ROW3's readout and the recording of gyroscopic sensor read out sample g4 occurred at hypothetical timestamp t=15 ms. Once the capture time for each particular anchor row 500 is known, the base motion for each anchor row 500 may be calculated based on the interpolation of the recorded positional sensor information having timestamps corresponding most closely to the timestamp of the particular anchor row 500.

Figure 6:
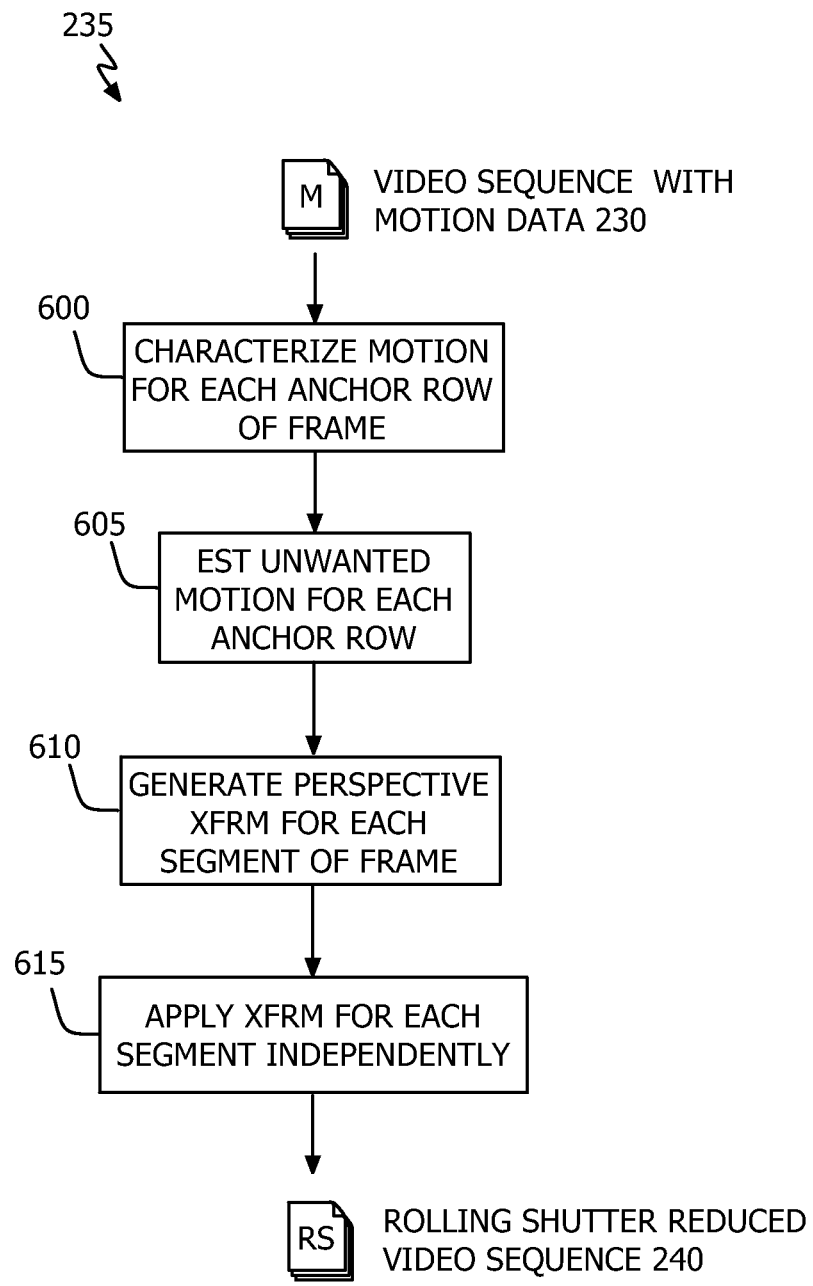
FIG. 6 shows, in flowchart form, a rolling shutter reduction operation, in accordance with another embodiment.
Figure 7A:
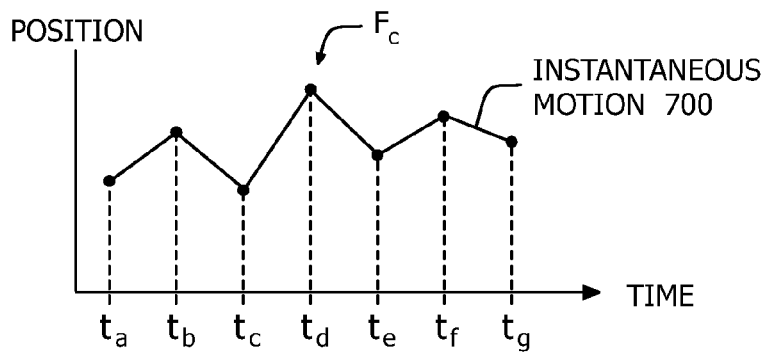
FIGS. 7A and 7B illustrate specific aspects of a rolling shutter reduction operation, in accordance with one embodiment.

Referring now to FIG. 6, rolling shutter reduction operation 235 as implemented in one embodiment may begin once images making up video sequence 230 begin to be received. Initially, the base motion of each anchor row in an image frame may be characterized with respect to corresponding anchor rows in a specified number of "neighbor" frames (block 600). Referring to FIG. 7A, in one embodiment the motion of an anchor row in a current frame (Fc) captured at time td may be characterized by the corresponding anchor rows of M number of previously captured frames (in this example M equals three, i.e., the frames captured at prior times ta, tb, and tc) and N number of subsequently captured frames (in this example N also equals three, i.e., the frames captured at later times te, tf, and tg). FIG. 7A plots the instantaneous position of the corresponding anchor row of each of these frames over time (represented as instantaneous motion signal 700). The solid lines between successive points have been provided to illustrate the "jittery" nature of motion data 215. It should be understood that only a single axis of motion is represented in FIG. 7, but that, in many practical applications, motion in three dimensions may be considered. It should also be noted that the choice of three frames before and three frames after the current frame is a design choice and may vary from implementation to implementation depending on, for example, the image sensor (e.g., image sensor 300) and the particular type of video capture unit being used (e.g., a professional stand-alone unit, a consumer stand-alone unit, or embedded in a consumer device such as a mobile telephone, portable music player or some other portable electronic device). In other embodiments, M and N may both equal one. In still other embodiments, e.g., in the case of an infinite impulse response (IIR) filter, M may be the number of all previously captured video frames.

Figure 7B:
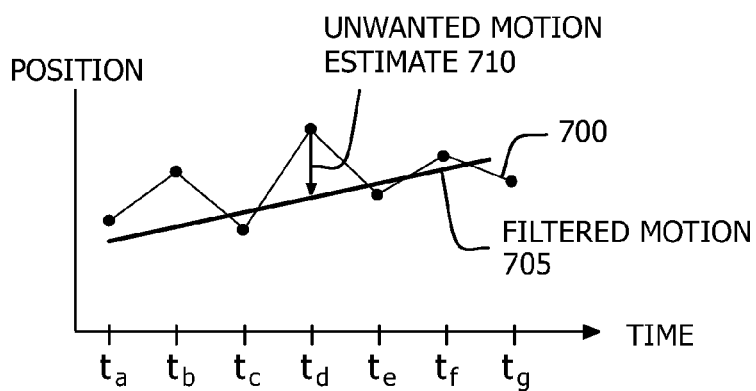

Returning to FIG. 6, it is assumed that smooth motion in a given direction is desired by the individual capturing the video sequence. For example, the video capture device may be smoothly panned to keep a specific target (e.g., a person) centered in the frame. It follows that any jittery or high-frequency motion is likely unintended (e.g., due to the individual's hand shaking). With this as background, and the motion of each anchor row of a frame characterized in accordance with block 600, the unwanted aspects of the anchor rows' motion may now be estimated (block 605). Referring to FIG. 7B, to estimate the unwanted motion components of the video capture device's movement, instantaneous motion signal 700 may be filtered to eliminate its high-frequency components (producing filtered motion signal 705). This may be accomplished, for example, by passing instantaneous motion signal 700 through a low-pass filter or, more generally, an infinite impulse response (IIR) or finite impulse response (FIR) filter. An estimate of the unwanted motion for an anchor row at current frame Fc (at time td) may then be given by the difference in the actual position of the anchor row at frame Fc (at time td) and filtered motion signal 705 (at time td) 710. In the example shown in FIGS. 7A and 7B, the current frame would be Fc (captured at time td) and the prior frame is that frame captured at time tc. This process may be repeated for the next "current" frame in a sliding-window fashion. For example, in FIG. 7A the next frame to become the "current" frame would be that frame captured at time te. Continuing to use the three prior and three subsequent frame windows introduced above, the prior frames upon which a new instantaneous motion signal would be based are those frames captured at times td, tc and tb. The successive frames upon which the new instantaneous motion signal would be based are those frames captured at times tf, tg and th (not shown).

Once an estimate of the unwanted motion for each anchor row has been determined in accordance with block 605, that unwanted motion may be subtracted from the motion of the anchor row that was determined in block 600 to obtain the "correction motion," i.e., the calculated amount of corrective motion that may be applied in order to reduce the effects of rolling shutter distortions, for the anchor row. In some embodiments, such as is illustrated in FIG. 5, once the correction motion has been calculated for each anchor row 500, the correction motion for each image segment 502 may be interpolated 510 based on the calculated correction motion of the nearest corresponding anchor rows. The correction motion along each axis (e.g., x, y, z) may then be collected into a single 3×3 "correction motion rotation matrix." Hereinafter, the correction motion matrix for each anchor row will be represented as rotation matrix [R12], where the subscript '2' represents or identifies the current frame and the subscript '1' represents or identifies a prior frame. Following this, a 2D perspective transform matrix may be calculated and applied independently to each row of the image frame.

Ideally, a rolling shutter distortion reduction process would be able to apply different correction motion estimates and the resulting transformation matrices to each row of the image frame. Such an implementation could be inefficient—especially when implemented using a Graphics Processing Unit (GPU). In many embodiments, the inventors have also discovered that applying a separate transformation to each row is not necessary to achieve a satisfactory reduction in rolling shutter distortion effects. Rather than a separately calculated transformation matrix being applied to each row, one embodiment described herein instead applies one transformation matrix to each image segment 502 independently. An image segment is simply a consecutive group of rows or columns from the captured image frame. The size of an image segment is adjustable from 1 row all the way up to the total number of rows captured by the image sensor array. In one embodiment, the image segment height is chosen to be 32 rows. Thus, for a captured image having 1,080 rows, there would be roughly 30 image segments. Accordingly, roughly 30 separately calculated transformation matrices would be applied to the corresponding image segments for each frame. It may also be understood from the described embodiments that each segment 502 may have one or more corresponding motion samples recorded at approximately the time that the consecutive rows comprising the segment were read out from the image sensor.

Returning again to FIG. 6, once the correction motion for each segment of the image frame has been determined, it may be used to generate a perspective transformation (block 610) for each segment. As discussed above, the size of image frame segments may be predetermined in a given implementation depending on the power and processing needs of the given implementation. Each segment's perspective transformation may be independently applied to the corresponding image segment in order to modify or compensate for the unwanted motion caused by the rolling shutter effect (block 615). The result is rolling shutter reduced video sequence 240.

Figure 8:
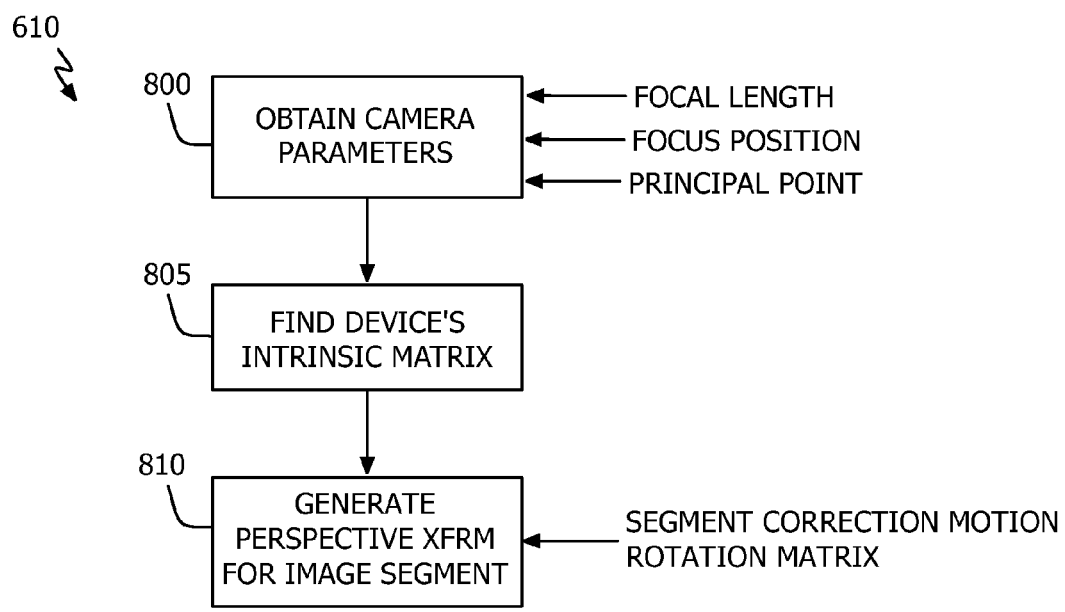
FIG. 8 shows, in flowchart form, one technique to generate a perspective transformation, in accordance with this disclosure.

Referring now to FIG. 8, in one embodiment, perspective transformation determination in accordance with block 610 begins by obtaining various image capture device parameter values (block 800). Illustrative parameters include the focal length and focus position used to capture a frame and the image capture device's principal point. It will be recognized that on image capture devices that provide the capability to move their lens and/or image sensor assemblies, the focus position may change from frame to frame. Based on the obtained parameters' values, the device's intrinsic matrix may be found or generated (block 805). A perspective transformation may then be determined for a particular image segment using the image capture device's intrinsic matrix associated with that frame (i.e., the intrinsic matrix generated using device parameter values that were in place when the frame was captured) and the image segment's "correction motion rotation matrix" identified above (block 810).

A perspective transformation for a particular image segment within a given frame may be derived as follows. First, it will be recognized by those of skill in the art that the 2D projection of real-space (which is 3D) onto an image sensor array (which is 2D) may be given as—

$$\begin{pmatrix} x \\ y \\ z \end{pmatrix} = \Pi \begin{pmatrix} X \\ Y \\ Z \end{pmatrix}, \quad \text{EQ. 1}$$

where $$\begin{pmatrix} X \\ Y \\ Z \end{pmatrix}$$

represents a point in real-space, $\Pi$ represents the image capture device's intrinsic matrix and $$\begin{pmatrix} x \\ y \\ z \end{pmatrix}$$

represents the 2D projection of the real-space point onto the image sensor's plane. In essence, EQ. 1 represents a 3D-to-2D transformation.

A novel use of this known relationship was to recognize that—

$$\begin{pmatrix} X \\ Y \\ Z \end{pmatrix} = \Pi^{-1} \begin{pmatrix} x \\ y \\ z \end{pmatrix}, \quad \text{EQ. 2}$$

where $$\begin{pmatrix} x \\ y \\ z \end{pmatrix}$$

represents a point in the sensor's 2D plane, $$\begin{pmatrix} X \\ Y \\ Z \end{pmatrix}$$

represents an estimate of where that point is in real-space, and $\Pi^{-1}$ represents the inverse of the image capture device's intrinsic matrix described above with respect to EQ 1. Thus, EQ. 2 represents a 2D-to-3D transformation estimator.

Based on the discussion above regarding blocks 600, 605 and FIG. 7, it will be recognized that—

$$\begin{pmatrix} X_1' \\ Y_1' \\ Z_1' \end{pmatrix} = [R_{01}] \begin{pmatrix} X_1 \\ Y_1 \\ Z_1 \end{pmatrix}, \quad \text{EQ. 3}$$

where $$\begin{pmatrix} X_1 \\ Y_1 \\ Z_1 \end{pmatrix}$$

represents the real-space location of a point at time t1, $[R_{01}]$ the rotation matrix for frame-1 from time t0 (and frame F0) to time t1 (and frame F1) mentioned before, and $$\begin{pmatrix} X_1' \\ Y_1' \\ Z_1' \end{pmatrix}$$

represents the location of the same point after the estimated unwanted motion has been removed.

From EQ. 2 we may obtain—

$$\begin{pmatrix} X_1 \\ Y_1 \\ Z_1 \end{pmatrix} = \Pi_1^{-1} \begin{pmatrix} x_1 \\ y_1 \\ z_1 \end{pmatrix},$$ EQ. 4 where $\Pi^{-1}$ represents the inverse of the image capture device's intrinsic matrix at time t1. Substituting EQ. 4 into EQ. 3 yields—

$$\begin{pmatrix} X_1' \\ Y_1' \\ Z_1' \end{pmatrix} = [R_{01}]\Pi_1^{-1} \begin{pmatrix} x_1 \\ y_1 \\ z_1 \end{pmatrix}.$$ EQ. 5

From EQ. 2 we may obtain—

$$\begin{pmatrix} X_1' \\ Y_1' \\ Z_1' \end{pmatrix} = \Pi_1^{-1} \begin{pmatrix} x_1' \\ y_1' \\ z_1' \end{pmatrix},$$ EQ. 6

Substituting EQ. 6 into EQ. 5 yields—

$$\Pi_1^{-1} \begin{pmatrix} x_1' \\ y_1' \\ z_1' \end{pmatrix} = [R_{01}]\Pi_1^{-1} \begin{pmatrix} x_1 \\ y_1 \\ z_1 \end{pmatrix}.$$ EQ. 7

Multiplying EQ. 7 by $\Pi_1$ yields—

$$\Pi_1 \Pi_1^{-1} \begin{pmatrix} x_1' \\ y_1' \\ z_1' \end{pmatrix} = \Pi_1 [R_{01}]\Pi_1^{-1} \begin{pmatrix} x_1 \\ y_1 \\ z_1 \end{pmatrix},$$ EQ. 8 which may be rewritten as—

$$\begin{pmatrix} x_1' \\ y_1' \\ z_1' \end{pmatrix} = \Pi_1 [R_{01}]\Pi_1^{-1} \begin{pmatrix} x_1 \\ y_1 \\ z_1 \end{pmatrix}.$$ EQ. 9 which may be rewritten as—

$$\begin{pmatrix} x_1' \\ y_1' \\ z_1' \end{pmatrix} = [P_{01}] \begin{pmatrix} x1 \\ y_1 \\ z1 \end{pmatrix},$$ EQ. 10 where $[P_{01}]$ represents the perspective transformation from time t0 (and frame F0) to time t1 (and frame F1) for a particular image segment within a given frame. Equations 9 and 10 describe how to remove unwanted motion from rows comprising a particular image segment at time t1 as reflected in rotation matrix $[R_{01}]$. It is also noted $[P_{01}]$ incorporates the image capture device's parameters (e.g., focal length and focus position) at times t0 and t1. More particularly, perspective transformation [P01] is based solely on the image capture device's parameter values (e.g., focal length and focus position) and determination of the image's unwanted motion component. This information is available from motion sensor 305 (e.g., a gyrometer). It will be recognized that this information is computationally inexpensive to obtain and process, allowing rolling shutter reduction operations in accordance with this disclosure to be performed quickly and at low computational cost.

Figure 9:
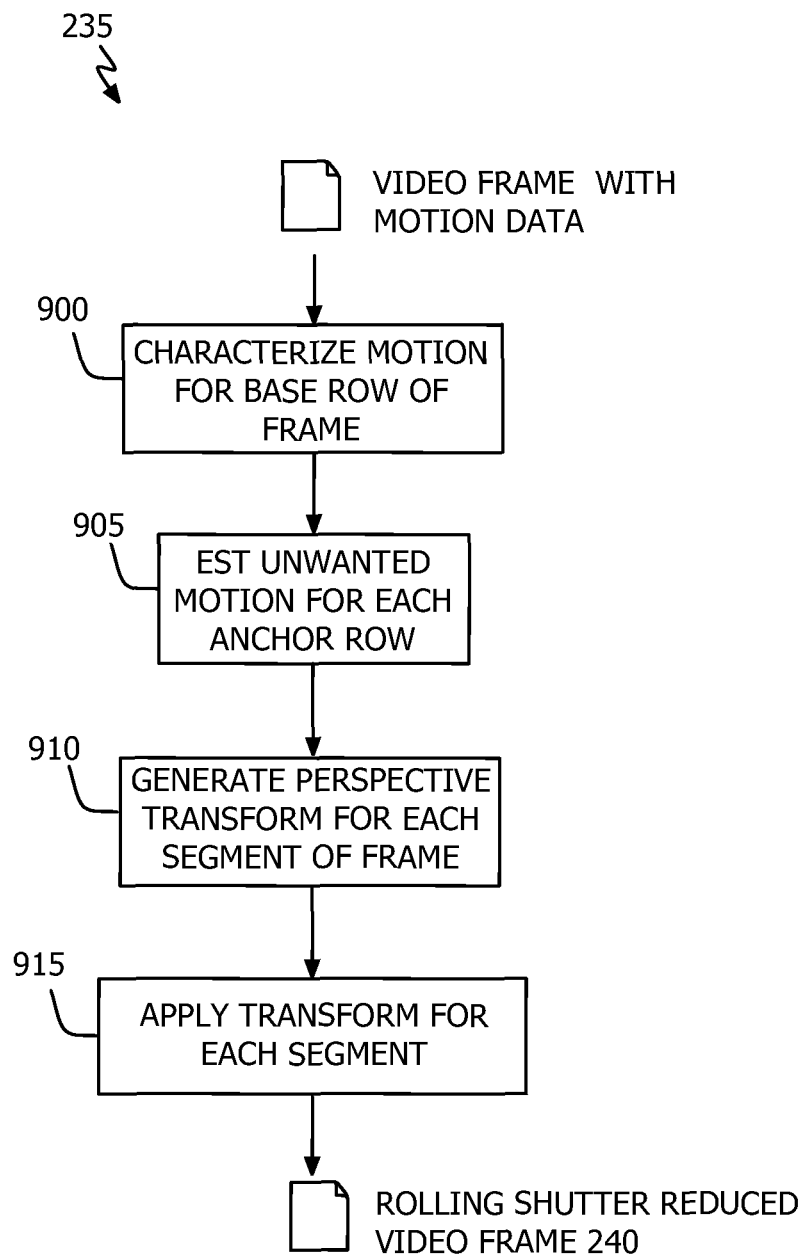
FIG. 9 illustrates an exemplary method for a rolling shutter reduction in accordance with an embodiment of the present invention.

According to an aspect of an exemplary embodiment, a correction motion rotation matrix for a frame may be calculated without reference to neighboring frames in the video sequence. Therefore, this embodiment can be applied to a single image as well as individual frames of a video sequence. FIG. 9 illustrates an exemplary method of rolling shutter reduction operation 235, shown in FIG. 2, according to an embodiment of the present invention.

The rolling shutter reduction operation 235 may include determining the correction motion for a row by finding a difference between the motion for that row and the motion of a base row (e.g., center row). The difference may be used to generate a perspective transformation to be applied to the row to reduce the effects of rolling shutter distortions. Thus, the rows of an image will have a perspective transform that is applied to each of the rows to reduce the effects of rolling shutter distortions with reference to the base row.

Initially, the base motion of each frame may be characterized with respect to a base row in the frame (block 900). For a given image or video frame, a single base row may be identified. For example, the base row may be identified as the center row of the frame or another row of the frame. For example, a row that coincides with a centroid of an object in the frame. The base row may be one of the anchor rows.

The base row may be associated with motion data captured from a motion sensor as described above. According to an embodiment, the motion associated with the base row may be estimated (block 900) by interpolating from the motion data of the frame, the motion associated with the capture time of the base row (e.g., the one or more gyroscopic sensor samples whose determined timestamps are closest to the timestamp of the base row). Similarly, the capture time of the base row may be estimated by interpolating from known capture times of two rows in the frame. The motion data associated with the base row may be considered the base motion for the frame.

With reference to the base motion determined in accordance with block 900, the unwanted aspects of the anchor rows' motion may be estimated (block 905). An estimate of the unwanted motion for an anchor row in the frame may be given by the difference in the motion information for the anchor row from the base motion. The motion information for the anchor row may be interpolated by interpolating from the motion data of the frame, the motion associated with the capture time of the anchor row. Additionally, the capture time of the anchor row may be estimated by interpolating from known capture times of two rows in the frame.

The unwanted motion, the difference in the motion information for the anchor row from the base motion, for each anchor row may correspond to the "correction motion," i.e., the calculated amount of corrective motion that may be applied in order to reduce the effects of rolling shutter distortions, for the anchor row. Although, obtaining the correction motion is discussed with reference to the anchor row, the correction motion may be determined for each row based on the motion data of each row and the motion of the base row. The correction motion along each axis (e.g., x, y, z) may then be collected into a single 3×3 "correction motion rotation matrix." Hereinafter, the correction motion matrix for each anchor row (i) will be represented as rotation matrix [$R_i$]. Following this, a 2D perspective transform matrix may be calculated and applied independently to each row or anchor row of the image frame.

A perspective transformation for a particular image segment within a given frame may be then be derived. In Equations 3-10, [$R_{01}$] may be replaced with [$R_i$] where [$R_i$] is the rotation matrix for row i, and [$P_{01}$] with [$P_i$] such that [$P_i$] represents the perspective transformation from a particular image segment within a given frame.

Once the correction motion for each anchor row or each segment of the image frame has been determined, it may be used to generate a perspective transformation (block 910) for each row or segment as previously described with respect to FIG. 6. Each segment's perspective transformation may be independently applied to the corresponding image segment in order to modify or compensate for the unwanted motion caused by the rolling shutter effect (block 915). The result is a rolling shutter reduced image or frame. For a video sequence, each of blocks 900 through 915 may be executed for each frame in the video sequence to generate a rolling shutter reduced video sequence 240.

As discussed above with reference to FIG. 6, a perspective transformation may be calculated for each row of an image frame. The motion may be determined for each row by using the motion data associated with each row to determine the difference in the motion information for each of the rows from the base motion. For example, FIG. 10 illustrates exemplary rows on the display of an electronic image capture device and a timeline for the read out of a portion of an image frame, in accordance with one embodiment.

Figure 10:
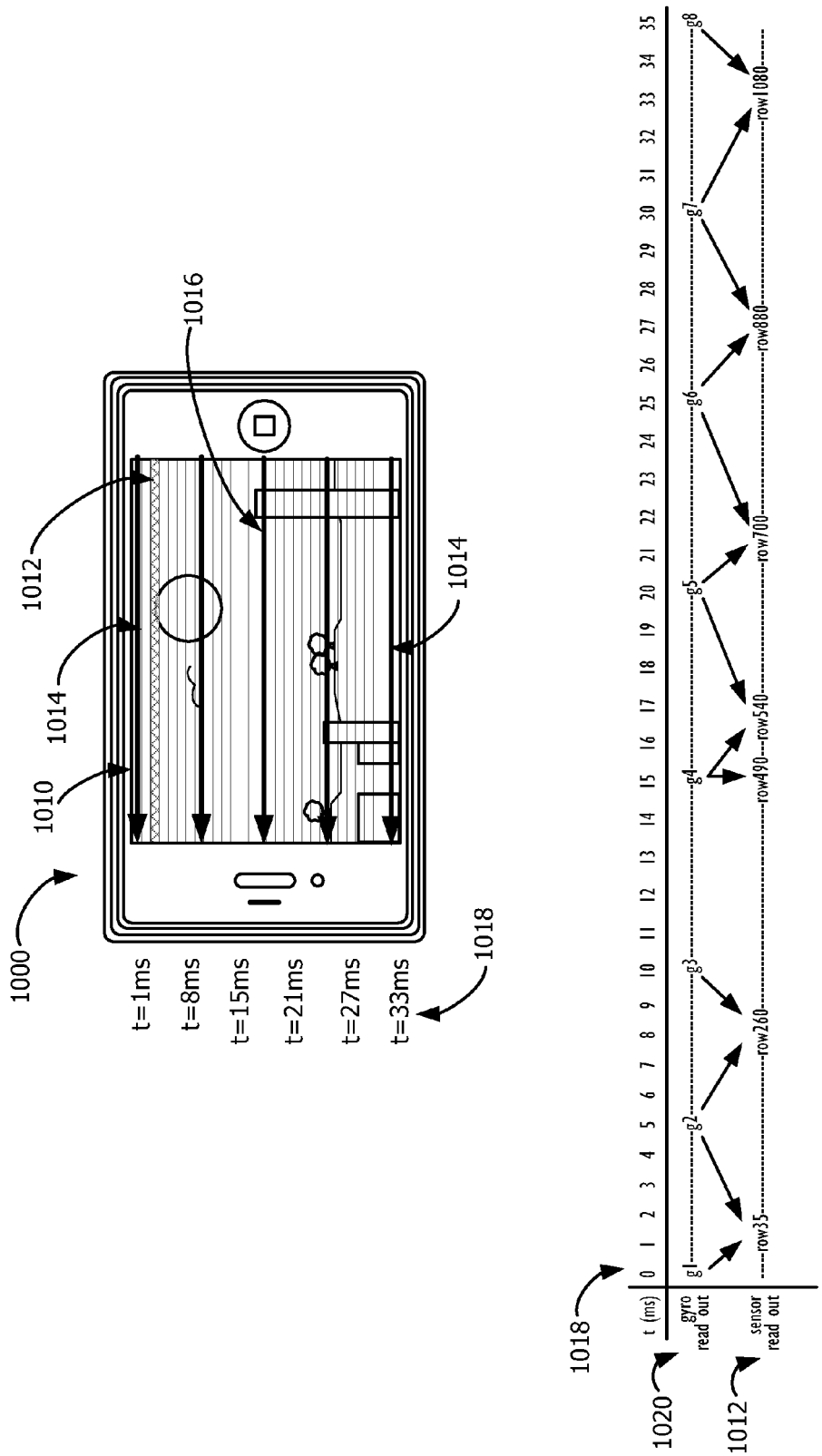
FIG. 10 illustrates exemplary rows on the display of an electronic image capture device and a timeline for the read out of a portion of an image frame, in accordance with one embodiment.

Referring to FIG. 10, an image capture device 1000 may include a display 1010 displaying an image having a plurality of rows 1012. The rows 1012 may include anchor rows 1014 and a center row 1016. In one particular embodiment, and as is shown in FIG. 10, there are five anchor rows 1014 corresponding to five different read out rows from the image sensor of image capture device 1000. As described above, by combining the knowledge of the timestamp for the beginning of a captured frame with the knowledge of the read out speed of the image sensor, the capture time 1018 for each row can be determined. In the exemplary embodiment of 1080p video frames being captured at the rate of thirty frames per second, it takes approximately 33.3 milliseconds for the sensor to capture a single image frame. As mentioned above, in one embodiment, a gyroscopic sensor has a sampling rate of 200 Hz, meaning that it reports a positional information sample readout every 5 ms.

As shown in FIG. 10, across the top of the timeline, time 1018 is listed out in one millisecond intervals from 0 ms to 35 ms. The first row of information in the timeline corresponds to gyroscopic sensor read outs 1020. As is shown, the gyroscopic sensor used in the example of FIG. 5 samples at a rate of 200 Hz (i.e., every 5 milliseconds), thus, the timeline shows gyroscopic sensor samples g1-g8 occurring at: 0 ms, 5 ms, 10 ms, 15 ms, 20 ms, 25 ms, 30 ms, and 35 ms. As discussed above, the CMOS sensor reads out the rows of an image in subsequent rows (e.g., 1080 rows for a 1080p video frame). In FIG. 10, for clarity only rows 35, 260, 490, 540, 700, 880 and 1080 are illustrated. One or more of these rows may correspond to an anchor row. For each row, a device rotation amount may be calculated by interpolating between the nearest gyroscopic sensor samples, i.e., the one or more gyroscopic sensor samples whose determined timestamps are closest to the determined timestamp of the anchor row.

For some rows, such as row 35, device rotation may be calculated by interpolating between several gyroscopic sensor read out samples, e.g., g1 and g2. For other rows, such as row 490, there may be a single gyroscopic sensor read out sample, e.g., g4, whose timestamp corresponds very closely with the read out time of the anchor row, such that the device rotation may be calculated by using the single gyroscopic sensor read out sample. The capture time for each row may be provided as a timestamp or the capture time may be determined by adding the capture time of the first row and the readout time difference. Once the capture time for row is known, the base motion for each row 1012 may be calculated based on the interpolation of the recorded positional sensor information 1020 having timestamps corresponding most closely to the timestamp of the particular row 1012.

The correction motion to be used for the perspective transformation may be determined by determining the motion for a base row (e.g., center row 540) and finding a difference in the motion information for each row from the base motion. The difference may be determined only for the anchor rows to reduce the complexity of the computation. The correction motion along each axis (e.g., x, y, z) may then be collected into a single 3×3 correction motion rotation matrix. Once the correction motion for each row or each anchor row of the image frame has been determined, it may be used to generate a perspective transformation for each row or segment as previously described with respect to FIG. 6. Each row's perspective transformation may modify or compensate for the motion caused by the rolling shutter effect.

As discussed above with reference to FIG. 6, motion due to, for example, individual's hand shaking, may be removed by comparing the motion of one or more rows to the motion of corresponding rows in frames captured before and/or after the current frame. The removal of this motion may be performed before estimating and/or removing the motion due to the rolling shutter effect or after removing the motion due to the rolling shutter effect.

Figure 11A:
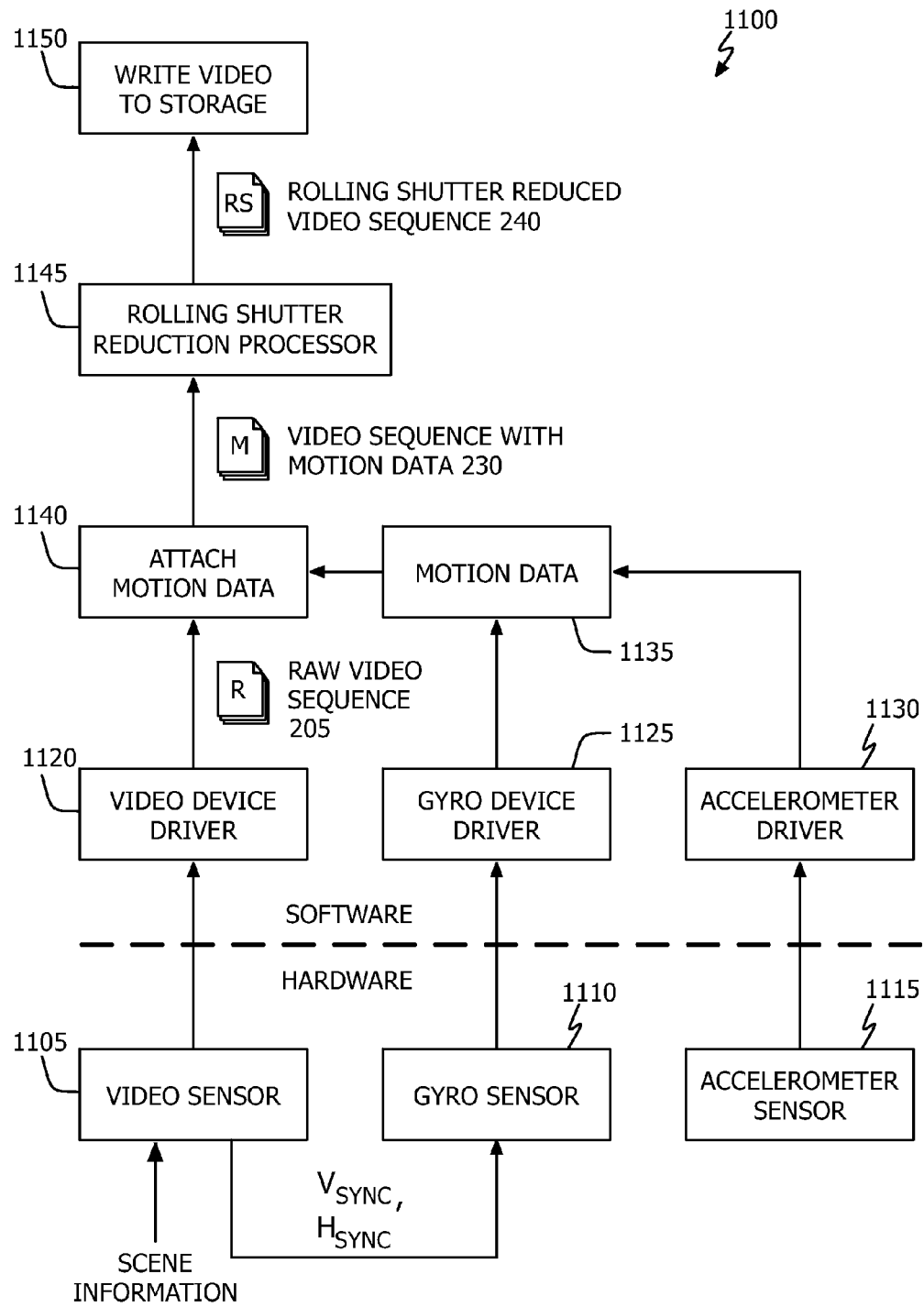
FIGS. 11A and 11B show, in a functional block diagram, two illustrative devices capable of providing rolling shutter reduction capability, in accordance with this disclosure.

Referring to FIG. 11A, a functional view of illustrative electronic device 1100 in accordance with this disclosure includes video sensor 1105 (also referred to herein as a sensor array, or image sensor), gyro sensor 1110, and accelerometer 1115. Video sensor 1105 provides video frames to video device driver 1120, gyro sensor 1110 provides motion data (e.g., rate of movement) to gyro device driver 1125, and accelerometer 1115 provides its data to accelerometer driver 1130. In the example of FIG. 11A, anchor rows of the video frames and motion data are correlated through the use of Vsync and Hsync signals as discussed above with respect to FIG. 3A. Gyro and accelerometer data may be collected to generate motion data 1135 which may then be attached 1140 to the individual frames within raw video sequence 205. Once motion data has been attached, motion augmented video sequence 230 may be sent to rolling shutter reduction processor 1145 which transforms each image segment of each frame in accordance with its particular perspective transformation to generate a rolling shutter reduced video sequence 240 that may then be written to storage 1150.

Figure 11B:
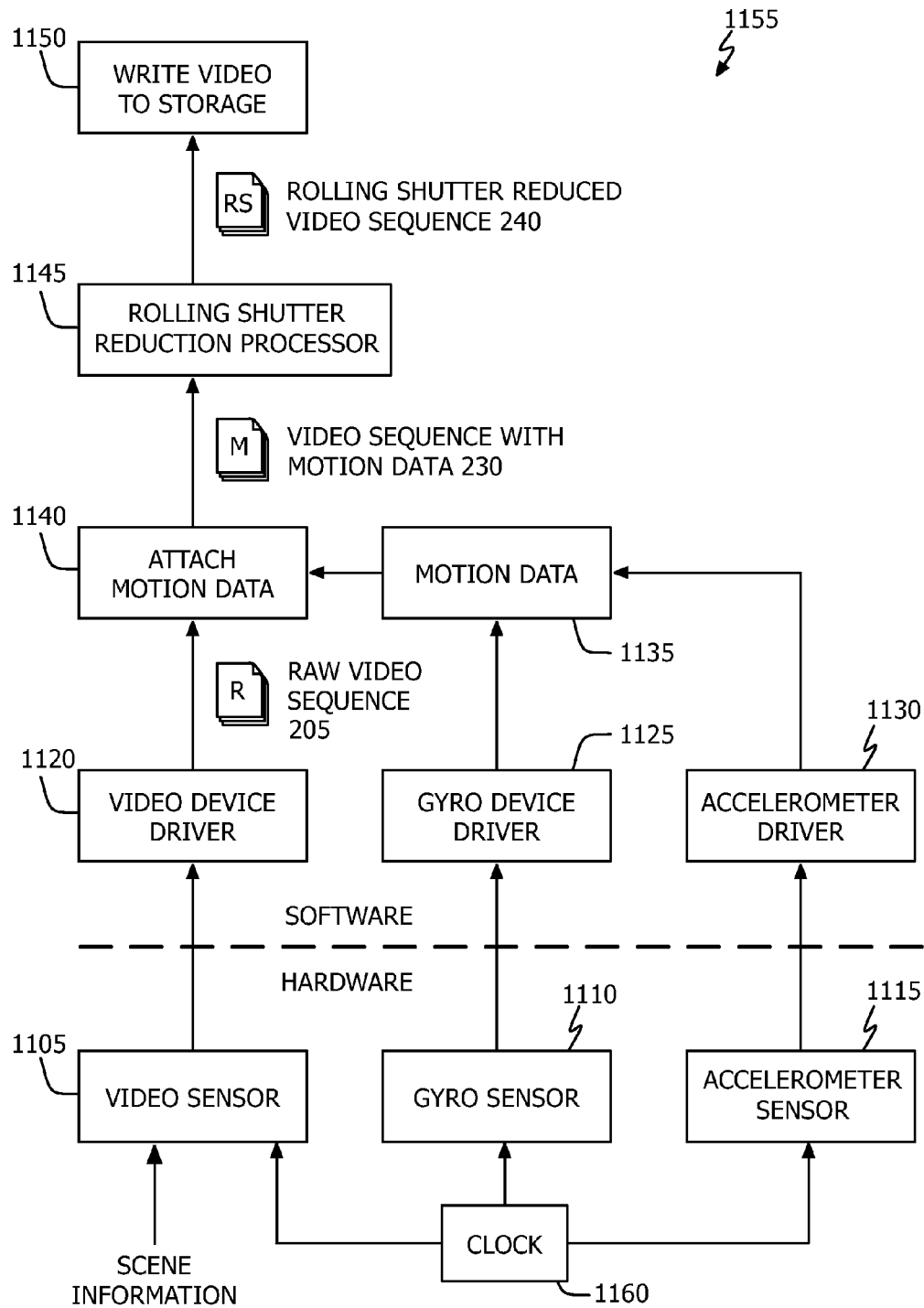

Referring to FIG. 11B, another illustrative video capture device 1155 is shown. In this embodiment, however, common clock 1160 drives video 1105, gyro 1110 and accelerometer 1115 sensors. As noted above with respect to FIG. 3B, use of common clock 1160 permits synchronous capture of image and motion data. In another alternative embodiment (not shown), a common timer (or two distinct timers driven by a common clock) may be used to add timestamps to video frames and gyro samples. Specifically, video frames and gyro samples may be generated with different clocks, but they may be timestamped by a common clock, or two timers driven by a common clock. In such an embodiment, the data acquisition may be asynchronous, but the timestamps would be synchronized to a common clock.

Figure 12:
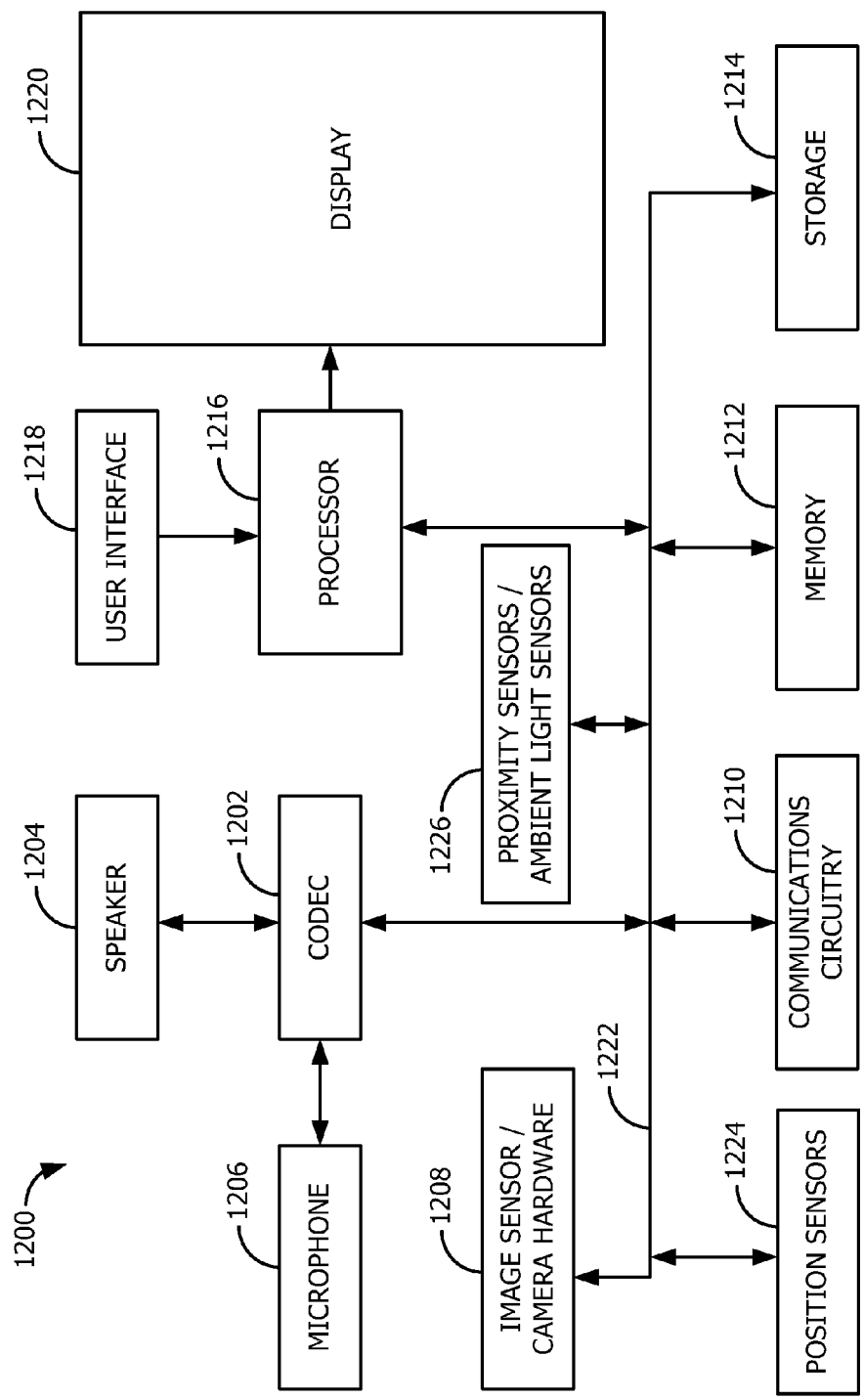
FIG. 12 shows, in block diagram form, an electronic device, in accordance with one embodiment.

Referring now to FIG. 12, a simplified functional block diagram of a representative electronic device possessing a display 1200 according to an illustrative embodiment, e.g., electronic image capture device 100, is shown. The electronic device 1200 may include a processor 1216, display 1220, proximity sensor/ambient light sensor 1226, microphone 1206, audio/video codecs 1202, speaker 1204, communications circuitry 1210, position sensors 1224 (e.g., accelerometers and/or gyrometers), image sensor with associated camera hardware 1208, user interface 1218, memory 1212, storage device 1214, and communications bus 1222. Processor 1216 may be any suitable programmable control device and may control the operation of many functions, such as the generation and/or processing of image metadata, as well as other functions performed by electronic device 1200. Processor 1216 may drive display 1220 and may receive user inputs from the user interface 1218. Processor 1216 may be any suitable programmable control device or general or special purpose processor or integrated circuit and may execute instructions necessary to carry out or control the operation of many functions, such as the generation and/or processing of image metadata, as well as other functions performed by electronic device 1200. Processor 1216 may, for example, be a system-on-chip, such as an applications processor found in a mobile device or a dedicated GPU and may, for example, be based upon a RISC, CISC or any other suitable architecture and may include one or more processing cores.

Storage device 1214 may store media (e.g., image and video files), software (e.g., for implementing various functions on device 1200), preference information, device profile information, and any other suitable data. Storage device 1214 may include one more storage mediums for tangibly recording image data and program instructions, including for example, a hard-drive, permanent memory such as ROM, semi-permanent memory such as RAM, or cache. Program instructions may comprise a software implementation encoded in any desired language (e.g., C or C++).

Memory 1212 may include one or more different types of memory which may be used for performing device functions. For example, memory 1212 may include cache, ROM, and/or RAM. Communications bus 1222 may provide a data transfer path for transferring data to, from, or between at least storage device 1214, memory 1212, and processor 1216. User interface 1218 may allow a user to interact with the electronic device 1200. For example, the user input device 1218 can take a variety of forms, such as a button, keypad, dial, a click wheel, or a touch screen.

In one embodiment, the personal electronic device 1200 may be an electronic device capable of processing and displaying media such as image and video files. For example, the personal electronic device 1200 may be a device such as such a mobile phone, personal data assistant (PDA), portable music player, monitor, television, laptop, desktop, and tablet computer, or other suitable personal device.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The foregoing description of preferred and other embodiments is not intended to limit or restrict the scope or applicability of the inventive concepts conceived of by the Applicant. As one example, although the present disclosure focused on handheld personal electronic image capture devices, it will be appreciated that the teachings of the present disclosure can be applied to other implementations, such as traditional digital cameras. In exchange for disclosing the inventive concepts contained herein, the Applicant desires all patent rights afforded by the appended claims. Therefore, it is intended that the appended claims include all modifications and alterations to the full extent that they come within the scope of the following claims or the equivalents thereof.

I claim:

1. A method for reducing rolling shutter distortion in a frame of image data, comprising:
    estimating motion of a base row of the frame based on motion sensor data representing motion of image sensor during capture;
    for a plurality of other rows of the frame, estimating a motion difference between motion of each other row and the base row based on the motion sensor data;
    generating a perspective transform for each other row based on the estimated motion difference; and
    applying the generated perspective transforms to image data of the rows to generate corrected frame data.

2. The method of claim 1, wherein the base row is a center row of the image.

3. The method of claim 1, wherein the base row is a center row located in an identified object of the image.

4. The method of claim 1, wherein estimating the motion difference, generating the perspective transformation and applying the generated perspective transform is performed on each row of the frame.

5. The method of claim 1, wherein estimating the motion difference, generating the perspective transformation and applying the generated perspective transform is performed on each anchor row of the frame.

6. The method of claim 1, wherein generating a perspective transform is based on the motion difference and image capture parameters comprising one or more of a principal point, a focus position, and a focal length.

7. The method of claim 1, wherein estimating the motion difference of at least one row of the other rows includes interpolating between a plurality of samples of motion data that are associated with the at least one row to obtain motion information for the at least one row.

8. The method of claim 1, wherein estimating the motion difference of the row of the frame includes compensating for motion of the row by finding an average of the motion of the row of the frame in the current frame and motion of corresponding rows in one or more adjacent images.

9. A method for reducing rolling shutter distortion in an input frame, comprising:
    determining motion of each input row of the input frame;
    finding a motion difference between the motion of a base row of the input frame and each of the input rows; and
    generating a plurality of transformed rows according to a plurality of corresponding perspective transforms, wherein the perspective transforms correct for shutter distortion associated with input rows based on the motion difference.

10. The method of claim 9, further comprising assembling the transformed rows to provide an output frame.

11. The method of claim 9, wherein the base row is a center row of the input frame.

12. The method of claim 9, wherein the perspective transforms are based on the motion difference and image capture parameters comprising one or more of a principal point, a focus position, and a focal length.

13. The method of claim 9, wherein determining motion of each input row of the input frame includes interpolating between a plurality of samples of motion data.

14. The method of claim 9, wherein determining motion includes using motion data from a motion sensor.

15. A non-transitory computer-readable storage medium storing computer-executable instructions that, when executed, cause a processor to execute a method comprising:
   determining motion of each input row of an input frame;
   finding a motion difference between the motion of a base row of the input frame and each of the input rows; and
   generating a plurality of transformed rows according to a plurality of corresponding perspective transforms, wherein the perspective transforms correct for shutter distortion associated with input rows based on the motion difference.

16. The non-transitory computer-readable storage medium of claim 15, wherein the base row is a center row of the input frame.

17. The non-transitory computer-readable storage medium of claim 15, wherein the perspective transforms are based on the motion difference and image capture parameters comprising one or more of a principal point, a focus position, and a focal length.

18. The non-transitory computer-readable storage medium of claim 15, wherein determining motion of each input row of the input frame includes interpolating between a plurality of samples of motion data.

19. An apparatus comprising:
   a image sensor to capture and output a sequence of input rows of an input frame;
   a motion sensor to output motion data corresponding to motion of the apparatus at approximately the time the image sensor captures the sequence of input rows;
   a memory to store a corrected frame; and
   a controller configured to:
      estimate motion of each input row based on the motion data;
      find a motion difference for each row between the motion of the row and a base row of the input frame;
      generate a perspective transform for each row based on the motion difference of the corresponding row;
      apply the corresponding generated perspective transform to each row to generate a corrected row;
      assemble the corrected rows into the corrected frame; and
      store the corrected frame in the memory.

20. The apparatus of claim 19, wherein the base row is a center row of the input frame.

21. The apparatus of claim 19, wherein the perspective transforms are based on the motion difference and intrinsic camera parameters comprising one or more of a principal point, a focus position, and a focal length.

22. The apparatus of claim 19, wherein estimating motion of each input row includes interpolating between a plurality of samples of the motion data.

23. A chip comprising:
   a video device driver configured to receive a captured frame including a plurality of captured rows;
   a motion sensor driver configured to receive motion data associated with the captured rows; and
   a rolling shutter distortion processor configured to:
      determine motion of each captured row of the captured frame;
      find a motion difference between the motion of a base row of the captured frame and each of the captured rows; and
      generate a plurality of transformed rows according to a plurality of corresponding perspective transforms, wherein the perspective transforms correct for shutter distortion associated with input rows based on the motion difference.

24. The chip of claim 23, wherein the base row is a center row of the captured frame.

25. The chip of claim 23, wherein the perspective transforms are based on the motion difference and intrinsic camera parameters comprising one or more of a principal point, a focus position, and a focal length.

26. A non-transitory computer-readable storage medium storing computer-executable instructions that, when executed, cause a processor to perform a method comprising:
   estimating motion of a base row of the frame based on motion sensor data representing motion of image sensor during capture;
   for a plurality of other rows of the frame, estimating a motion difference between motion of each other row and the base row based on the motion sensor data;
   generating a perspective transform for each other row based on the estimated motion difference; and
   applying the generated perspective transforms to image data of the rows to generate corrected frame data.

27. The non-transitory computer-readable storage medium of claim 26, wherein the base row is a center row of the image.

28. The non-transitory computer-readable storage medium of claim 26, wherein generating a perspective transform is based on the motion difference and image capture parameters comprising one or more of a principal point, a focus position, and a focal length.

29. The non-transitory computer-readable storage medium of claim 26, wherein estimating the motion difference of at least one row of the other rows includes interpolating between a plurality of samples of motion data that are associated with the at least one row to obtain motion information for the at least one row.

30. An apparatus comprising:
   a image sensor to capture and output a sequence of rows of a frame of image data;
   a motion sensor to output motion data corresponding to motion of the apparatus at approximately the time the image sensor captures the sequence of rows;
   a memory to store a corrected frame; and
   a controller configured to:
      estimate motion of a base row of the frame based on the motion data representing motion of the apparatus during capture;
      for a plurality of other rows of the frame, estimate a motion difference between motion of each other row and the base row based on the motion data;
      generate a perspective transform for each other row based on the estimated motion difference; and
      apply the generated perspective transforms to image data of the rows to generate corrected frame data.

31. The apparatus of claim 30, wherein the base row is a center row of the frame.

32. The apparatus of claim 30, wherein generating a perspective transform is based on the motion difference and image capture parameters comprising one or more of a principal point, a focus position, and a focal length.

33. The apparatus of claim 30, wherein estimating the motion difference of at least one row of the other rows includes interpolating between a plurality of samples of motion data that are associated with the at least one row to obtain motion information for the at least one row.

34. A chip comprising:
- a video device driver configured to receive a captured frame including a plurality of captured rows;
- a motion sensor driver configured to receive motion data associated with the captured rows; and
- a rolling shutter distortion processor configured to:
  - estimate motion of a base row of the frame based on the motion data;
  - for a plurality of other rows of the frame, estimate a motion difference between motion of each other row and the base row based on the motion data;
  - generate a perspective transform for each other row based on the estimated motion difference; and
  - apply the generated perspective transforms to image data of the rows to generate corrected frame data.

35. The chip of claim 34, wherein the base row is a center row of the frame.

36. The chip of claim 34, wherein generating a perspective transform is based on the motion difference and image capture parameters comprising one or more of a principal point, a focus position, and a focal length.

37. The chip of claim 34, wherein estimating the motion difference of at least one row of the other rows includes interpolating between a plurality of samples of motion data that are associated with the at least one row to obtain motion information for the at least one row.

* * * * *